(12) United States Patent
Hirakawa et al.

(10) Patent No.: US 9,042,282 B2
(45) Date of Patent: May 26, 2015

(54) WIRELESS COMMUNICATION DEVICE, WIRELESS COMMUNICATION SYSTEM, AND CHANNEL SWITCHING METHOD

(71) Applicant: Sony Computer Entertainment Inc., Tokyo (JP)

(72) Inventors: Tai Hirakawa, Tokyo (JP); Hideaki Shimizu, Ibaraki (JP); Jun Nishihara, Kanagawa (JP); Kenji Inose, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 164 days.

(21) Appl. No.: 13/795,985

(22) Filed: Mar. 12, 2013

(65) Prior Publication Data

US 2013/0201918 A1  Aug. 8, 2013

Related U.S. Application Data

(63) Continuation of application No. PCT/JP2011/005163, filed on Sep. 14, 2011.

(30) Foreign Application Priority Data

Sep. 15, 2010  (JP) .................... 2010-207063

(51) Int. Cl.
*H04B 7/00* (2006.01)
*H04W 36/06* (2009.01)
(Continued)

(52) U.S. Cl.
CPC .............. *H04W 36/06* (2013.01); *H04W 8/005* (2013.01); *H04W 24/00* (2013.01); *H04W 48/08* (2013.01); *H04W 48/16* (2013.01)

(58) Field of Classification Search
CPC .. H04W 76/02; H04W 76/027; H04W 76/028
USPC .......................... 370/310, 315, 329, 330, 343
See application file for complete search history.

(56) References Cited

U.S. PATENT DOCUMENTS 6,690,657 B1 * 2/2004 Lau et al. .................... 370/315
6,718,160 B2 * 4/2004 Schmutz .................... 455/11.1
(Continued)

FOREIGN PATENT DOCUMENTS

JP     2005142883 A     6/2005
JP     2005151433 A     6/2005
(Continued)

OTHER PUBLICATIONS

International Search Report for the corresponding PCT Application No. PCT/JP2011/005163, dated Nov. 15, 2011.
(Continued)

*Primary Examiner* — Dmitry H Levitan
(74) *Attorney, Agent, or Firm* — Matthew B. Dernier, Esq.; Gibson & Dernier LLP

(57) ABSTRACT

A first communication control unit and a second communication control unit share a single transmission and reception unit. The second communication control unit maintains connection with a terminal device while the first communication control unit is scanning frequency channels to search for an access point. When a search processing unit 104 detects an access point, the second communication control unit 200 switches the frequency channel for use in communication with the terminal device to the channel used in the detected access point.

11 Claims, 15 Drawing Sheets

(51) Int. Cl.
*H04W 48/16* (2009.01)
*H04W 8/00* (2009.01)
*H04W 24/00* (2009.01)
*H04W 48/08* (2009.01)

(56) References Cited

U.S. PATENT DOCUMENTS

| | | | |
|---|---|---|---|
| 7,120,138 B2 * | 10/2006 | Soomro et al. | 370/343 |
| 7,206,840 B2 * | 4/2007 | Choi et al. | 709/225 |
| 7,231,215 B2 * | 6/2007 | Lewis et al. | 455/450 |
| 7,689,164 B2 | 3/2010 | Nishio | |
| 7,787,408 B2 * | 8/2010 | Proctor et al. | 370/315 |
| 7,990,904 B2 * | 8/2011 | Proctor et al. | 370/315 |
| 8,175,064 B2 * | 5/2012 | Tan et al. | 370/335 |
| 8,493,992 B2 * | 7/2013 | Sella et al. | 370/445 |
| 8,588,146 B2 * | 11/2013 | Gossain et al. | 370/329 |
| 2005/0107088 A1 | 5/2005 | Oura | |
| 2006/0034315 A1 | 2/2006 | Maekawa | |
| 2007/0025486 A1 * | 2/2007 | Gainey et al. | 375/356 |
| 2007/0206628 A1 | 9/2007 | Nishio | |

FOREIGN PATENT DOCUMENTS

| | | |
|---|---|---|
| JP | 2007243238 A | 9/2007 |
| JP | 2010199998 A | 9/2010 |

OTHER PUBLICATIONS

International Preliminary Examination Report on Patentability with Written Opinion for the corresponding PCT Application No. PCT/JP2011/005163, dated Apr. 9, 2013.

* cited by examiner

FIG.5

| Element ID | Length | Channel Switch Mode | New Channel Number | Channel Switch Count |

Channel Switch Announcement element

FIG.11A

| REMAINING TIME | ≤ 90 ms | > 90 ms ≤ 80 ms | > 80 ms ≤ 70 ms | > 70 ms ≤ 60 ms | > 60 ms ≤ 50 ms | > 50 ms ≤ 40 ms | > 40 ms ≤ 30 ms | > 30 ms ≤ 20 ms | > 20 ms ≤ 10 ms | > 10 ms |
|---|---|---|---|---|---|---|---|---|---|---|
| COUNT VALUE | 9 | 8 | 7 | 6 | 5 | 4 | 3 | 2 | 1 | 0 |

FIG.11B

| REMAINING TIME | ≤ 80 ms | > 80 ms ≤ 60 ms | > 60 ms ≤ 40 ms | > 40 ms ≤ 20 ms | > 20 ms |
|---|---|---|---|---|---|
| COUNT VALUE | 4 | 3 | 2 | 1 | 0 |

FIG.13A

| COUNT VALUE | 9 | 8 | 7 | 6 | 5 | 4 | 3 | 2 | 1 | 0 |
|---|---|---|---|---|---|---|---|---|---|---|
| REMAINING TIME | 95ms | 85ms | 75ms | 65ms | 55ms | 45ms | 35ms | 25ms | 15ms | 5ms |

FIG.13B

| COUNT VALUE | 4 | 3 | 2 | 1 | 0 |
|---|---|---|---|---|---|
| REMAINING TIME | 90ms | 70ms | 50ms | 30ms | 10ms |

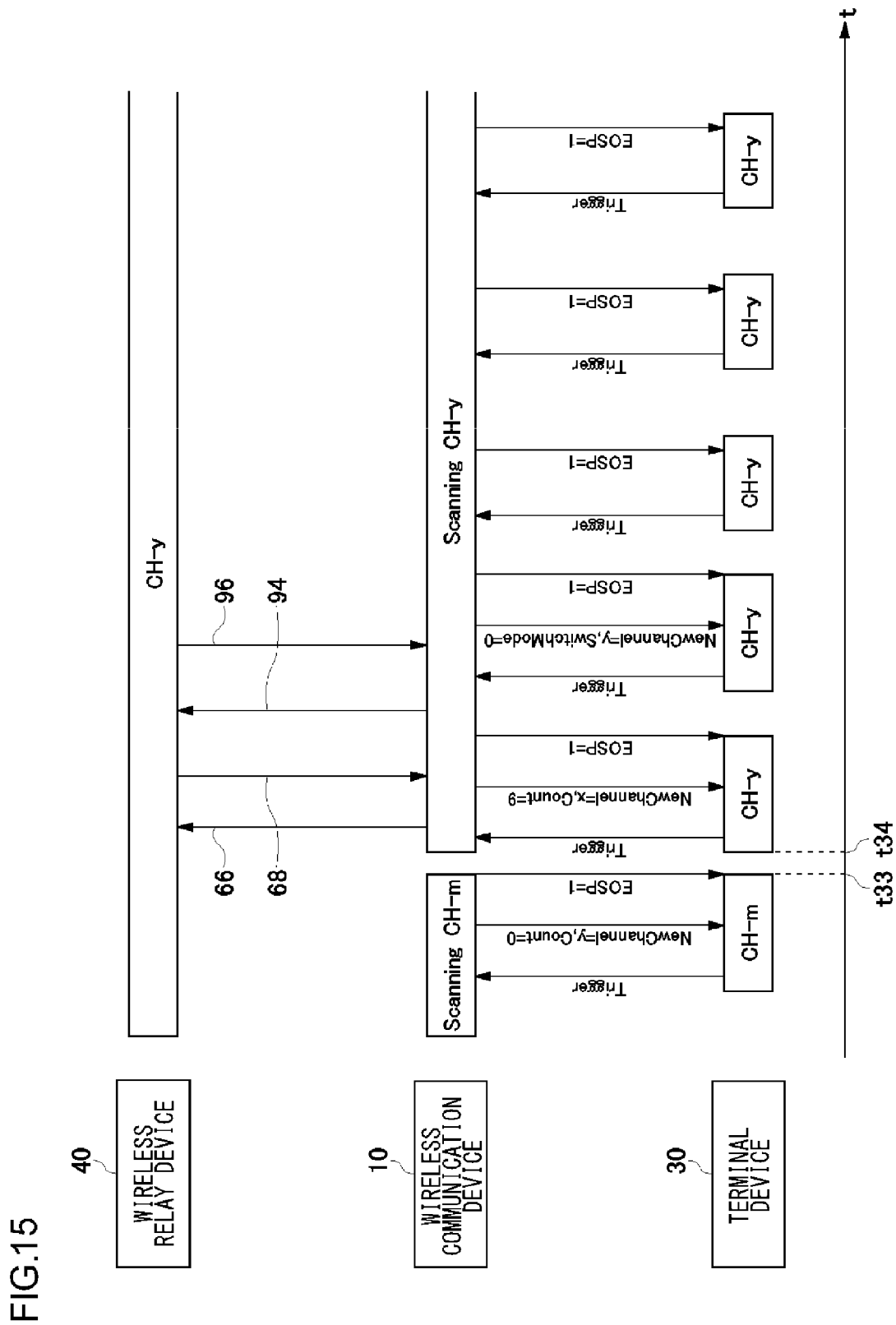

WIRELESS COMMUNICATION DEVICE, WIRELESS COMMUNICATION SYSTEM, AND CHANNEL SWITCHING METHOD

BACKGROUND OF THE INVENTION

1. Field of the Invention

The present invention relates to a wireless communication technology.

2. Description of the Related Art

In IEEE802, specifications for a physical layer (PHY) and a data link layer (DLL), two lower layers of the OSI model, are built. Frame transmission and reception is controlled by PHY and DLL. DLL is divided into a logical link control (LLC) sublayer and a media access control (MAC) sublayer. PHY operates as an interface between MAC and a wireless transmission channel, and MAC operates as an interface between LLC and PHY.

An infrastructure network includes an access point. A wireless local area network (LAN) client transmits and receives a frame to and from the access point. The MAC unit of the access point determines a frequency channel to use and manages transmission and reception of frames to and from the wireless LAN client by using the determined frequency channel. The wireless LAN client uses the frequency channel determined by the access point to transmit and receive frames to and from the access point.

To participate in an infrastructure network, the wireless LAN client performs a scanning process for finding a network. One known technique for a scanning process is called active scan. In the active scan, a wireless LAN client transmits a probe request frame on a plurality of frequency channels included in a channel list. If there is an access point that uses the frequency channel of the probe request frame, the access point generates a probe response frame and returns the frame to the wireless LAN client. This allows the wireless LAN client to find an infrastructure network and participate in the network found.

In the IEEE802.11 specification, access to a wireless medium is provided by carrier sense multiple access/collision avoidance (CSMA/CA). In this communication protocol, the wireless LAN terminal attempts to receive any signal in a given frequency channel before initiating communication in the given frequency channel so as to determine whether there is any other terminal currently communisyating (Carrier Sense). If there are not other terminals using the same frequency channel, the wireless LAN terminal starts communication (Multiple Access). If the terminal finds another terminal communicating as a result of Carrier Sense, it means that the likelihood of collision is high if transmission is attempted concurrently with the termination of communication by the other terminal. The terminal waits time of random duration after detecting termination of communication by the other terminal, and initiates transmission (Collision Avoidance). Thus, the wireless LAN terminal verifies that competition with other terminals does not occur before transmitting and receiving a frame to and from the access point.

[patent document No. 1] US2006/034315

To provide a wireless communication device with the function of connecting to an external wireless relay device operating as an access point and concurrently connecting to an external wireless terminal device (i.e., the function whereby the wireless communication device operates as a terminal and an access point), the wireless communication device preferably comprises two sets of MAC unit and PHY unit. The two sets of MAC unit and PHY unit do not basically affect each other and can operate independently of each other. Therefore, the wireless communication device provided with the two sets can use one of the sets to operate as a wireless LAN client in relation to the external wireless relay device and can use the other to operate as an access point in relation to an external wireless terminal device.

Meanwhile, the wireless communication device may be configured to use one PHY unit to connect to an external wireless relay device and an external wireless terminal device for the reason of reduction of manufacturing cost, etc. Such a wireless communication device uses the same frequency channel generated by the solitary PHY unit to transmit and receive a frame to and from an external wireless relay device and an external wireless terminal device. If the external wireless relay device changes the frequency channel to use for some reason, the air link between the wireless communication device and the external wireless relay device is disconnected. In order to restore connection with the external wireless relay device, the wireless communication device should perform a scanning process to search for the external wireless relay device. However, a scanning process requires sequentially switching the channel to use. Therefore, the frequency channel used hitherto for communication with the external wireless terminal device is changed sequentially, resulting in a disadvantage in that the connection with the external wireless terminal device cannot be maintained.

SUMMARY OF THE INVENTION

Accordingly, a purpose of the present invention is to provide a technology of maintaining connection with a wireless terminal device while a scanning process is being performed.

The wireless communication device that addresses the above problem comprises: a first communication control unit configured to control communication with a first terminal device; a second communication control unit configured to control communication with a second terminal device; and a transmission and reception unit configured to transmit and receive a frame using one of a plurality of frequency channels. The first communication control unit comprises a search processing unit configured to scan the plurality of frequency channels to search for the first terminal device, and the second communication control unit maintains connection with the second terminal device while the search processing unit is searching for the first terminal device, and when the search processing unit detects the first terminal device and identifies the frequency channel used by the detected first terminal device, the second communication control unit uses the frequency channel identified by the search processing unit to control communication with the second terminal device.

Another embodiment of the present invention relates to a wireless communication system comprising a wireless communication device, a first terminal device connected to the wireless communication device, and a second terminal device connected to the wireless communication device. The first terminal device operates as an access point for the wireless communication device, and the wireless communication device operates as an access point for the second terminal device. The wireless communication device comprises: a first communication control unit configured to control communication with a first terminal device; a second communication control unit configured to control communication with a second terminal device; and a transmission and reception unit configured to transmit and receive a frame using one of a plurality of frequency channels. The first communication control unit comprises a search processing unit configured to scan the plurality of frequency channels to search for the first terminal device, and the second communication control unit maintains connection with the second terminal device while the search processing unit is searching for the first terminal device, and when the search processing unit detects the first terminal device and identifies the frequency channel used by the detected first terminal device, the second communication control unit uses the frequency channel identified by the search processing unit to control communication with the second terminal device.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 shows the format of Information Element for channel switching;

FIG. 11A shows a count value determination table; and FIG. 11B shows another example;

FIG. 13A shows an exemplary remaining time determination table, and FIG. 13B shows another example;

FIG. 15 shows the transition sequence of channel switching shown in FIG. 14 in further detail.

DETAILED DESCRIPTION OF THE INVENTION

The invention will now be described by reference to the preferred embodiments. This does not intend to limit the scope of the present invention, but to exemplify the invention.

Figure 1:
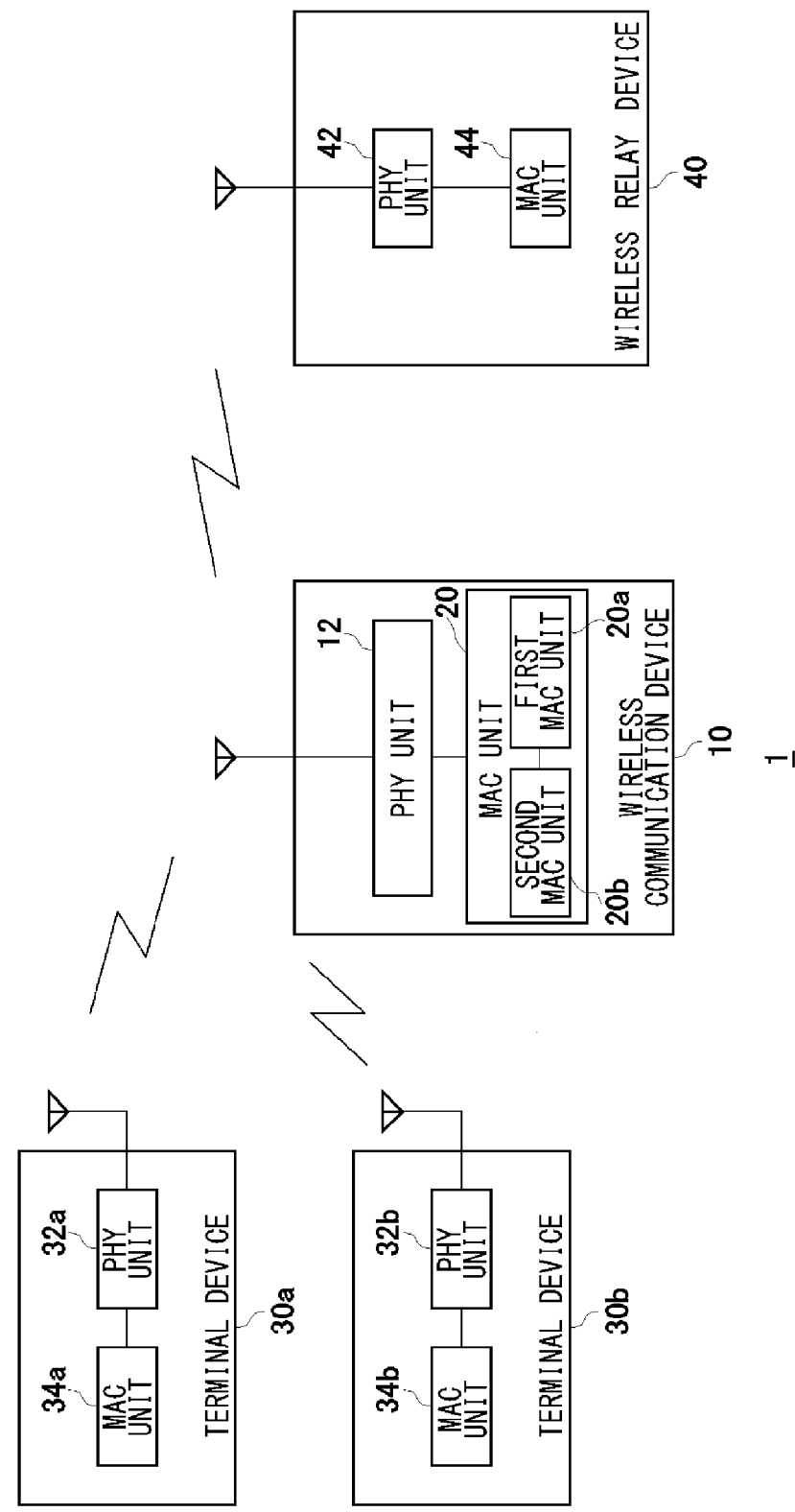
FIG. 1 shows a wireless communication system according to an embodiment of the present invention.

FIG. 1 shows a wireless communication system 1 according to an embodiment of the present invention. The wireless communication system 1 comprises a wireless communication device 10, terminal devices 30a, 30b (hereinafter, generically referred to as "terminal devices 30" as necessary), and a wireless relay device 40, to build an infrastructure network using an access point. The wireless communication device 10, the terminal devices 30, and the wireless relay device 40 are wireless LAN terminal devices. The terminal device 30 and the wireless relay device 40 transmit and receive a frame (or data) to and from the wireless communication device 10. The wireless communication system 1 may include one terminal device 30 or three or more terminal devices 30.

The wireless communication device 10 is provided with at least one PHY unit and as many or more MAC units. In the example shown in FIG. 1, the wireless communication device 10 comprises one PHY unit 12 and one MAC unit 20. The number of PHY units 12 and MAC units 20 is non-limiting. The MAC unit 20 shown in FIG. 1 is provided with a first MAC unit 20a and a second MAC unit 20b. The first MAC unit 20a and the second MAC unit 20b in this embodiment are labels to denote the functionality in the MAC unit 20. The first MAC unit 20a and the second MAC unit 20b may be implemented in a single module or separate modules. Physically, the MAC unit 20 may be of a single-chip configuration. Alternatively, the MAC unit 20 may comprise a plurality of (e.g., two) chips. In this case, the functionality of the first MAC unit 20a and that of the second MAC unit 20b may be embodied in the respective chips.

The terminal device 30a is provided with a MAC unit 34a and a PHY unit 32a. The terminal device 30b is provided with a MAC unit 34b and a PHY unit 32b. The wireless relay device 40 is provided with a MAC unit 44 and a PHY unit 42. The wireless relay device 40 may be provided with a plurality of sets of MAC unit 44 and PHY unit 42.

Two infrastructure networks are built in the wireless communication system 1. In the infrastructure network built by the wireless relay device 40 and the wireless communication device 10, the wireless relay device 40 operates as an access point, and the wireless communication device 10 operates as a wireless LAN client. In the infrastructure network built by the wireless communication device 10 and the wireless terminal devices 30, the wireless communication device 10 operates as an access point, and the terminal devices 30 operate as wireless LAN clients.

For example, the wireless communication device 10 may be a game device capable of running a game application. The terminal device 30 may be a wireless game controller capable of transmitting a user input for game control to the game device. The wireless relay device 40 may be an access point connected to a network such as the Internet. In the environment of the wireless communication system 1, the wireless communication device 10 is adapted to receive an input for game control from the terminal device 30 (game controller) and an input for game control from another user routed over the Internet and received via the wireless relay device 40. The wireless communication device 10 reflects game control inputs of users in the game progress so that a match-up game involving a plurality of users can be run.

In the wireless communication device 10, the first MAC unit 20a for controlling transmission and reception of a frame to and from the wireless relay device 40 and the second MAC unit 20b for controlling transmission and reception of a frame to and from the terminal device 30 share the single PHY unit 12. As described already, the first MAC unit 20a and the second MAC unit 20b may be implemented in a single module or separate modules. Therefore, transmission and reception of a frame between the wireless relay device 40 and the wireless communication device 10 and transmission and reception of a frame between the wireless communication device 10 and the terminal device 30 are normally executed on the same frequency channel generated by the PHY unit 12. Since the frequency channel used between the wireless relay device 40 and the wireless communication device 10 is determined by the wireless relay device 40, the wireless communication device 10 is required to match the frequency channel used for communication with the terminal device 30 to the frequency channel determined by the wireless relay device 40.

Therefore, when a new need arises for the wireless communication device 10 to connect to the wireless relay device 40 while communicating wirelessly with the terminal device 30, the wireless communication device 10 should search for the wireless relay device 40 by running a scanning process such as active scan. In the active scan, the wireless communication device 10 searches for the wireless relay device 40 by scanning all channels included in the channel list, i.e., by periodically switching the channel. This forces the wireless communication device 10 to discontinue the frequency channel used for communication with the terminal device 30. In the related-art communication system, the wireless communication device 10 provided with only one PHY unit 12 cannot maintain connection with the terminal device 30. Wireless connection between the terminal device 30 and the wireless communication device 10 will also be terminated as the wireless communication device 10 starts to search for the wireless relay device 40 by the active scan, when the wireless relay device 40 changes the channel to use while the wireless communication device 10 is concurrently connecting to the wireless relay device 40 and the terminal device 30 wirelessly. Similarly, wireless connection between the terminal device 30 and the wireless communication device 10 will also be terminated as the terminal device 30 starts to search for another wireless relay device 40 different from the wireless relay device 40 currently connected, when the wireless communication device 10 is concurrently communicating with the wireless relay device 40 and the terminal device 30.

Figure 2:
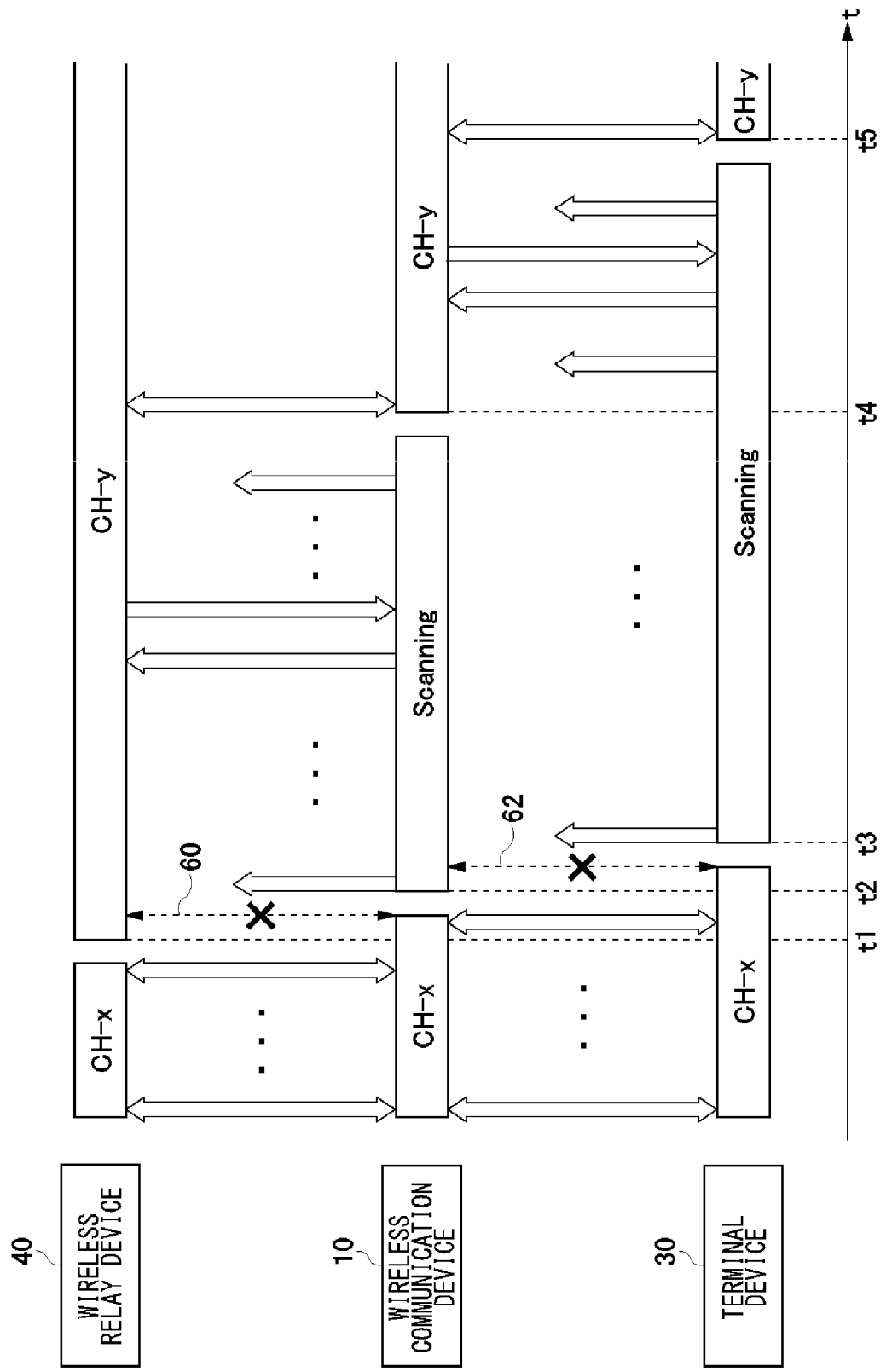
FIG. 2 shows a transition sequence of channel switching in the related-art communication system.

FIG. 2 shows a transition sequence of channel switching in the related-art communication system. For convenience of explanation, only one terminal device 30 is shown. Alternatively, a plurality of terminal devices may be included in the system. In the example shown in FIG. 2, the wireless communication device 10 initially establishes an air link with the wireless relay device 40 and the terminal device 30 using channel x (CH-x). At time t1, the wireless relay device 40 switches the channel to use to channel y (CH-y).

After time t1, the wireless communication device 10 attempts to send a frame 60 to the wireless relay device 40 using Ch-x, but the transmission of the frame 60 fails because the wireless relay device 40 no longer uses CH-x. After repeating failed attempts predetermined several times, the wireless communication device 10 learns that the wireless relay device 40 is not using CH-x and starts an active scan at time t2. Meanwhile, after time t2, the terminal device 30 attempts to transmit a frame 62 to the wireless communication device 10 using CH-x, but the transmission of the frame 62 fails because the wireless communication device 10 is performing an active scan. After repeating failed attempts predetermined several times, the terminal device 30 starts an active scan at time t3. This allows the wireless communication device 10 to transmit and receive a frame to and from the wireless relay device 40 using CH-y.

After time t4, the terminal device 30 finds the wireless communication device 10 in CH-y by active scan. When an active scan of all the channels included in the channel list has been completed, the terminal device 30 participates at time t5 in an infrastructure network in which the wireless communication device 10 operates as an access point, matching the frequency channel of the PHY unit 32 to the channel used in the wireless communication device 10 (CH-y). This allows the terminal device 30 to transmit and receive a frame to and from the wireless communication device 10 using CH-y after time t5.

In this channel transition sequence, the terminal device 30 cannot transmit or receive a frame to and from the wireless communication device 10 in a scanning period between time t3 and time t5. The terminal device 30 performs an active scan according to the channel list. The channel list includes, for example, 13 channels. It takes about 100 ms (millisecond) to scan a single channel. Therefore, an active scan consumes at least one second for execution. Further, the terminal device 30 cannot perform a valid active scan until the wireless communication device 10 finds the wireless relay device 40 and establishes a channel to use (time t4). Counting the time required for the wait, it takes two seconds or longer for the terminal device 30 to complete the scan.

For example, if the wireless communication device 10 is a game device and the terminal device 30 is a wireless game controller, data transmission from the wireless game controller to the game device should preferably occur at periods commensurate with the frame rate of the game screen (60 fps) in order to reflect control inputs via the wireless game controller in the game screen in a substantially real time manner. To pursue strict real-timeness, the period of data transmission from the wireless game controller to the game device should be defined at 16.6 (1/60) ms or less. Even if strict real-timeness is not pursued, a delay of one second or more will likely to make the user feel uneasy and so is not favorable. Therefore, failure for the wireless game controller to transmit control input data for two seconds or more in the related-art wireless communication system cannot be permitted for the purpose of game progress.

A description will now be given of the operation mode of the wireless game controller. Since the wireless game controller is battery-driven, operation in a power-saving mode is favorable. The Unscheduled Automatic Power-Save Delivery (U-APSD) specifications in the 802.11 standard provide the following advantages.

U-APSD allows the wireless game controller to synchronize data frame transmission and reception with the game device (access point) and enter a power saving mode while not transmitting nor receiving a frame. The wireless game controller maintains connection with the game device until it receives End of Service Period (EOSP) of a bit value of 1 included in the data frame and goes to sleep when the bit value of 1 is received. The wireless game controller defines the time to startup next time from the sleep state by itself. When the wireless game controller starts up, the controller transmits a trigger signal to the game device and resumes transmission and reception of a frame to and from the game device. For example, the wireless game controller may start up at periods of 10 ms so as to achieve a data transmission period of 16.6 ms or less.

The following two exemplary embodiments concern a technology whereby the wireless communication device 10 (game device) is allowed to search for the wireless relay device 40 by active scan and, at the same time, the period of disable communication between the terminal device 30 (wireless game controller) and the wireless communication device 10 (game device) is reduced as much as possible. The wireless communication device 10 is assumed to operate in U-APSD. However, the mode of operation is non-limiting.

First Exemplary Embodiment

Figure 3:
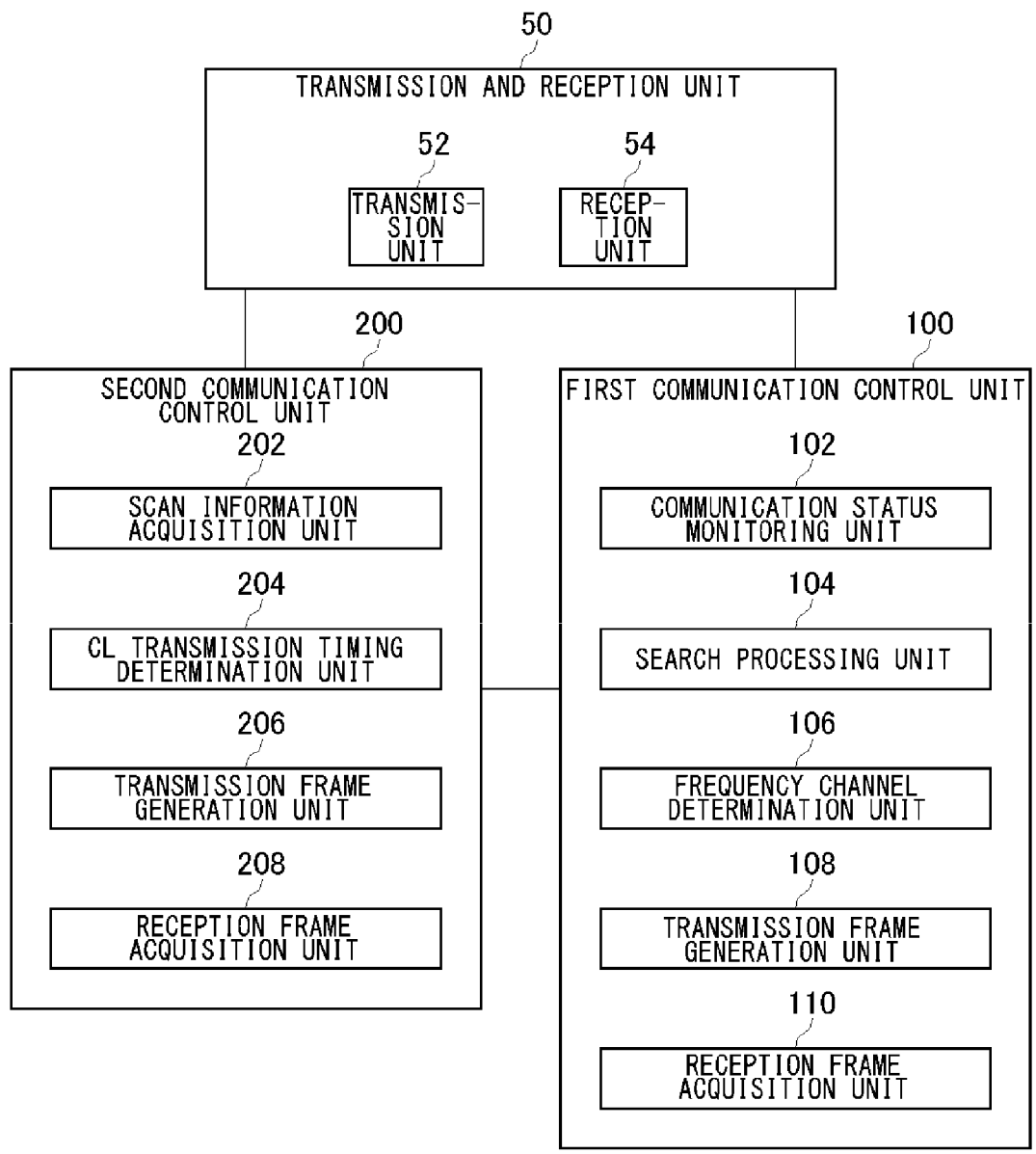
FIG. 3 shows functional blocks of the wireless communication device according to the first exemplary embodiment.

FIG. 3 shows functional blocks of the wireless communication device 10 according to the first exemplary embodiment. The wireless communication device 10 is provided with a transmission and reception unit 50, a first communication control unit 100, and a second communication control unit 200. Referring to FIG. 1, the transmission and reception unit 50 corresponds to the PHY unit 12 and is provided with a transmission unit 52 and a reception unit 54. The first communication control unit 100 corresponds to the first MAC unit 20*a* for controlling transmission and reception of a frame to and from the wireless relay device 40, and the second communication control unit 200 corresponds to the second MAC unit 20*b* for controlling transmission and reception of a frame to and from the terminal device 30. The first communication control unit 100 is provided with a communication status monitoring unit 102, a search processing unit 104, a frequency channel determination unit 106, a transmission frame generation unit 108, and a reception frame acquisition unit 110. The second communication control unit 200 is provided with a scan information acquisition unit 202, a CL transmission timing determination unit 204, a transmission frame generation unit 206, and a reception frame acquisition unit 208. For convenience of explanation, the first communication control unit 100 and the second communication control unit 200 are shown in FIG. 3 as being separate functional blocks. As described above, the first MAC unit 20*a* and the second MAC unit 20*b* may be implemented in a single MAC module. By implementing the MAC units in a single MAC module, the transmission frame generation unit 108 and the transmission frame generation unit 206 may be integrated into a single transmission frame generation unit. Even when the MAC units are implemented in a single MAC module, the reception frame acquisition unit 110 and the reception frame acquisition unit 208 are provided as separate reception frame acquisition units.

The functions of the first communication control unit 100 and the second communication control unit 200 may be implemented by a CPU, a memory, a program loaded in the memory, etc. FIG. 3 depicts functional blocks implemented by the cooperation of these elements. Therefore, it will be obvious to those skilled in the art that the functional blocks may be implemented in a variety of manners by hardware only, software only, or a combination of thereof.

Figure 4:
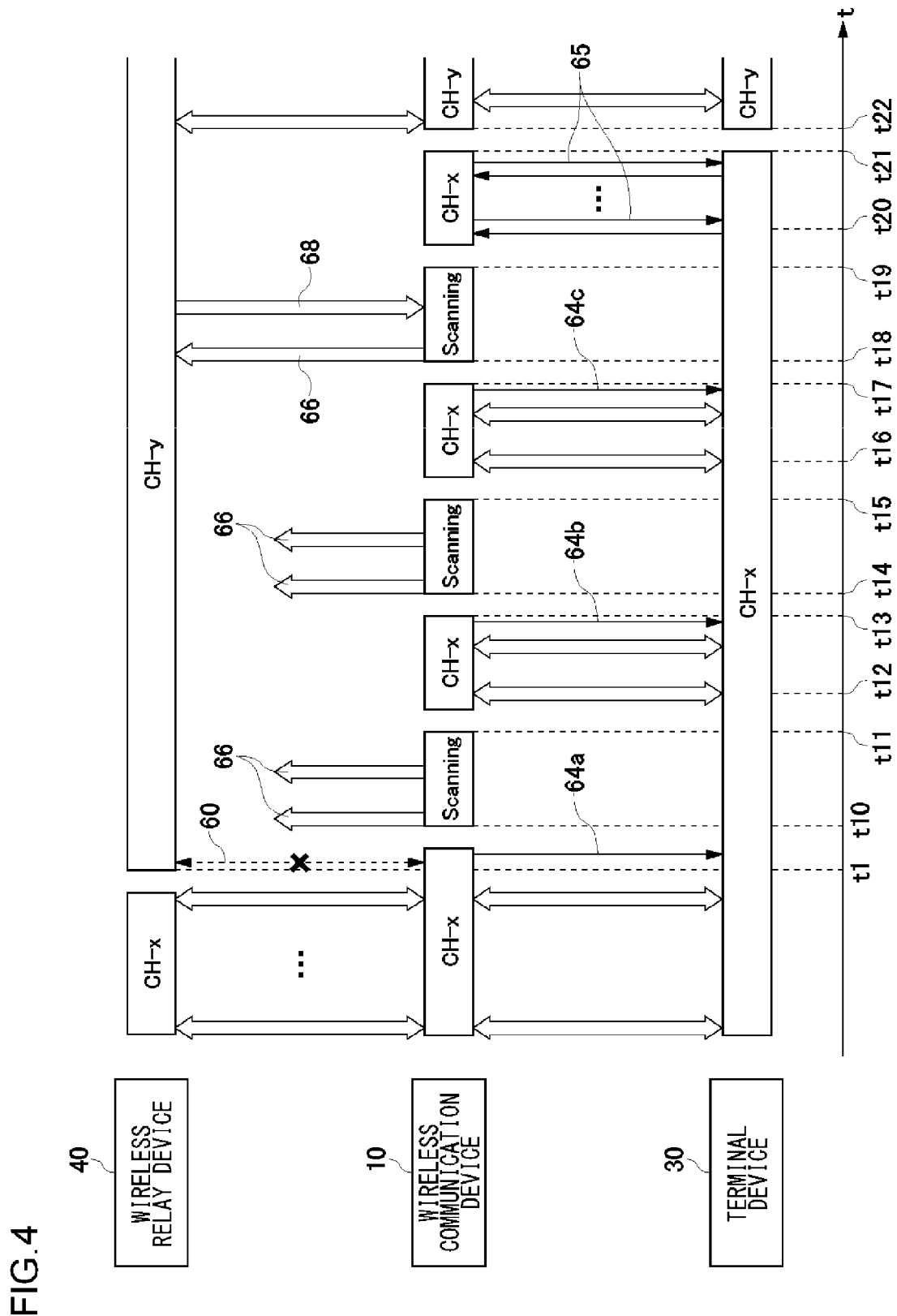
FIG. 4 shows a transition sequence of channel switching in the wireless communication system comprising the wireless communication device according to the first exemplary embodiment.

FIG. 4 shows a transition sequence of channel switching in the wireless communication system 1 comprising the wireless communication device 10 according to the first exemplary embodiment. For convenience of explanation, only one terminal device 30 is shown. Alternatively, a plurality of terminal devices may be included in the system. The terminal device 30 operates in a power saving mode that uses U-APSD. The terminal device 30 transmits a trigger signal to the wireless communication device 10 (access point). When the terminal device 30 receives EOSP of a bit value of 1 from the wireless communication device 10, the device 30 goes to sleep. The terminal device 30 defines the time to startup itself next time. When the device 30 starts up from the sleeping state, the device 30 transmits a trigger signal to the wireless communication device 10 and resumes transmission and reception of a frame to and from the device 10 until the device 30 receives EOSP with a bit value 1. For example, the terminal device 30 may start up itself at periods of 10 ms.

In the example shown in FIG. 4, the wireless communication device 10 has established an air link with the wireless relay device 40 and the terminal device 30 using channel x (CH-x) in the first place. At time t1, the wireless relay device 40 switches the channel to use channel y (CH-y). After time t1, the wireless communication device 10 attempts to send a frame 60 in CH-x to the wireless relay device 40, but the transmission of the frame 60 fails because the wireless relay device 40 no longer uses CH-x. After repeating failed attempts predetermined several times, the wireless communication device 10 learns that the wireless relay device 40 is not using CH-x and starts an active scan at time t10.

The wireless communication device 10 maintains a channel list of frequency channels that can be used. In the first exemplary embodiment, the wireless communication device 10 does not continuously scan all frequency channels included in the channel list but scans in several isolated steps. In each step, the wireless communication device 10 searches for the wireless relay device 40 on at least one frequency channel. For example, where the channel list includes 13 channels and the required scan (search) time per channel is 100 ms, the wireless communication device 10 searches for the wireless relay device 40 on one channel at a time. Therefore, discontinuous active scan of 13 frequency channels is performed in this case. Between successive search steps is defined a period where the wireless communication device 10 and the terminal device 30 can communicate with each other.

The scan time per step depends on the duration of communication delay permitted between the wireless communication device 10 and the terminal device 30. If the permitted duration of communication delay is 200 ms, the wireless communication device 10 may scan two channels in a single search step. If the scan time per channel is 50 ms and the permitted duration of communication delay is 100 ms, the wireless communication device 10 may scan two channels in a single search step. FIG. 4 shows only three search steps for brevity. In the first exemplary embodiment, however, the wireless communication device 10 intermittently performs 13 search steps as described above.

Before starting an active scan, the wireless communication device 10 communicates EOSP of a bit value of 1 and the transmission time of the next trigger signal to the terminal device 30. Transmission time of a trigger signal from the terminal device 30 is determined to be in a period when the wireless communication device 10 is not performing a search step. In other words, the transmission time is determined to a timing after the wireless communication device 10 completes the current search step and before the wireless communication device 10 starts the next search step. In response to the communication, the terminal device 30 goes to sleep and configures next startup time immediately before the transmission time which is communicated from the wireless communication device 10. Timing information communicated from the wireless communication device 10 may designate an absolute clock time or a relative clock time (e.g., after certain milliseconds). The terminal device 30 is started up by itself immediately before the transmission time communicated from the wireless communication device 10 and transmits a trigger signal to the wireless communication device 10 in concurrence with the communicated transmission time.

Referring to FIG. 4, the transmission time is communicated by transmitting data frames 64*a*, 64*b*, and 64*c* that include EOSP of a bit value of 1. The wireless communication device 10 generates a data frame 64 including information designating the transmission time, and transmits the frame to the terminal device 30 before a search step is started. In the U-APSD mode, the terminal device 30 operates to define next startup time by itself. When the data frame 64 is received, the terminal device 30 defines the next startup time in accordance with the transmitted timing designation information. For example, a certain flag may be defined in the data frame 64. The terminal device 30 may determine the timing to start up the device 30 next time by referring to the flag and extracting the information designating the transmission time included in the data frame 64. The terminal device 30 defines the next startup time according to the information only when the data frame 64 including a certain flag is received. Absent the reception of such a data frame, the terminal device 30 autonomously configures the next startup time 10 ms after the device 30 was started up (activated) previously. The information designating the transmission time may be included in types of frames other than a data frame.

When the terminal device 30 does not operate in the U-APSD mode, the wireless communication device 10 may schedule transmission of a trigger signal from the terminal device 30. The wireless communication device 10 adds information designating the timing to transmit the next frame in the frame transmitted to the terminal device 30. This allows the terminal device 30 to refer to the frame transmission timing designation information and define the transmission time of the next frame at each time the terminal device 30 receives the frame from the wireless communication device 10.

The terminal device 30 may be provided with an operation mode entered when the wireless communication device 10 performs a scanning step. For example, when the wireless communication device 10 notifies the terminal device 30 that the device 10 initiates a scanning step at a predetermined clock time, the terminal device 30 enters a predetermined operation mode. In this operation mode, the terminal device 30 periodically repeats a sleep mode and a data transmission mode, starting at a predetermined clock time. A sleep mode is entered while the wireless communication device 10 is performing a search step, and a data transmission mode is entered between successive search steps undertaken by the wireless communication device 10.

Referring to FIG. 4, when the wireless communication device 10 learns that the wireless relay device 40 is not using CH-x after time t1, the wireless communication device 10 transmits to the terminal device 30 a data frame 64*a* including information designating the time to transmit the next trigger signal of the terminal device 30. The wireless communication device 10 starts a search step in a frequency channel at time t10 and completes the search step at time t11. After the search step, the wireless communication device 10 switches the frequency channel to use to CH-x. The terminal device 30 makes a transition from the sleep state to the on state before the transmission time designated in the data frame 64*a*. When the designated time comes (time t12), the terminal device 30 transmits a trigger signal so as to transmit and receive a frame. Before the next search step, the wireless communication device 10 transmits to the terminal device 30 the data frame 64*b* including the information designating the time to transmit the next trigger signal of the terminal device 30, along with EOSP of a bit value of 1. The wireless communication device 10 switches the channel at time t13 and performs a search step in a new frequency channel at time t14. Subsequently, the wireless communication device 10 repeats a search step and transmission/reception step of a frame to and from the terminal device 30.

More specifically, the wireless communication device 10 performs a search step between time t14 and time t15 and subsequently switches the channel to use to CH-x. At time t16, the wireless communication device 10 receives a trigger signal from the terminal device 30, and transmits and receives a frame. After transmitting the data frame 64*c* and communicating the timing (t20) to transmit the next trigger signal, the wireless communication device 10 switches the channel at time t17. At time t18, the wireless communication device 10 performs a search step in a new frequency channel. The wireless communication device 10 performs a search step between time t18 and time t19 and subsequently switches the channel to use to CH-x. At time t20, the wireless communication device 10 receives a trigger signal from the terminal device 30, and transmits and receive a frame.

In active scan, the wireless communication device 10 transmits a probe request frame 66. If the wireless relay device 40 is using the frequency channel of the probe request frame 66, the wireless relay device 40 generates a probe response frame 68 and returns the frame 68 to the wireless communication device 10. In the example shown in FIG. 4, the wireless communication device 10 receives the probe response frame 68 from the wireless relay device 40 in the third active scan step (search step). This allows the wireless communication device 10 to know the existence of the wireless relay device 40 and identify the frequency channel used by the wireless relay device 40. As described above, FIG. 4 shows three search steps, but 13 search steps are performed actually.

When all search steps are completed, the wireless communication device 10 determines the frequency channel for connection to the wireless relay device 40. Between time t20 and time t21, the wireless communication device 10 communicates the determined frequency channel and the timing to switch the channel to the terminal device 30. More specifically, the wireless communication device 10 transmits a frame 65 that includes the determined frequency channel and the channel switching timing to the terminal device 30.

In the 802.11 specifications, the method of switching the channel using a beacon frame and a management frame is defined. Whichever frame is used, Information Element (IE) for channel switching is appended to a frame before communicating the frame to the client.

FIG. 5 shows the format of Information Element for channel switching. Fields for "Element ID", "Length", "Channel Switch Mode", "New Channel Number", "Channel Switch Count" are provided in this format and 8-bit data is written in each field. Information indicating whether the channel should be switched is written in "Channel Switch Mode", data identifying the channel to make a transition to is written in "New Channel Number", and information indicating countdown before transition is written in "Channel Switch Count". The client that receives Information Element learns the channel to make a transition to by referring to the data in "New Channel Number" and learns the timing for transition by referring to the countdown information in "Channel Switch Count". When the countdown information indicates zero before transition, the client learns that it is time to make a transition. Even if the frame including the countdown information indicating zero cannot be received, the client can make a transition to the next channel by predicting when the countdown information indicates zero based on the previously received countdown information.

Figure 6:
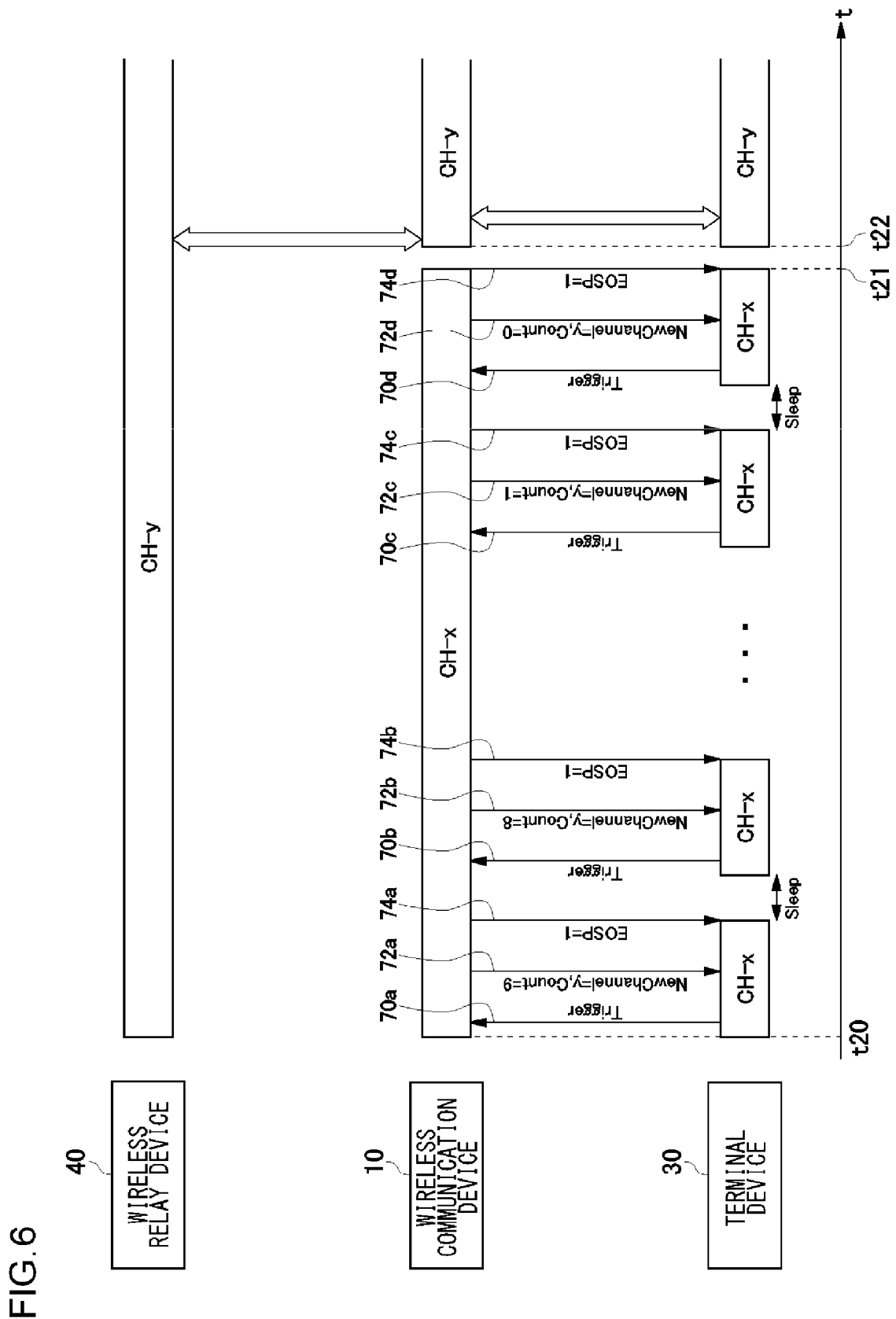
FIG. 6 shows a sequence for switching the channel by using a management frame in which Information Element for channel switching is added.

FIG. 6 shows a sequence of performing channel switching by using a management frame in which Information Element for channel switching is added. FIG. 6 shows a detailed sequence after time t20 in FIG. 4, when the step of channel switching is performed. The terminal device 30 operates in U-APSD and so goes to sleep when it receives EOSP of a bit value of 1.

When the terminal device 30 transmits a trigger signal 70*a* to the wireless communication device 10, the wireless communication device 10 transmits a management frame 72*a* to the terminal device 30. The management frame 72*a* is configured to include Information Element shown in FIG. 5. In this case, the management frame 72*a* includes data indicating "New Channel=y" and "Count=9". Referring to FIG. 5, "New Channel=y" indicates that the channel to make a transition to is CH-y, and "Count=9" indicates the countdown information of 9. After transmitting the management frame 72*a*, the wireless communication device 10 transmits to the terminal device 30 a data frame 74a in which EOSP indicating a bit value of 1 is added. By transmitting the management frame 72a before the data frame 74a, the terminal device 30 can receive the management frame 72a before going to sleep.

Referring to FIG. 4, the scanning period per frequency channel is defined to be 100 ms in the wireless communication system 1 according to the first exemplary embodiment. The period interposed between scanning processes for frame transmission and reception to and from the terminal device 30 is also defined to be 100 ms. When there are a plurality of terminal devices 30, the terminal devices 30 operate independently and non-synchronously so that transmission from the terminal device 30 may incur a delay due to CSMA/CA. By defining the period for transmitting and receiving a frame to and from the terminal device 30 to be about 100 ms, it is ensured that data transmission and reception between the terminal device 30 and the wireless communication device 10 occurs within the period.

The terminal device 30 recovers from the sleep state at periods of 10 ms and transmits a trigger signal 70b. The terminal device 30 receives a management frame 72b and a data frame 74b from the wireless communication device 10 in the stated order. In the management frame 72b, the value of "Channel Switch Count" is decremented by one. Thus, the value of "Channel Switch Count" is used as countdown information. The step is repeated. When the terminal device 30 transmits a trigger signal 70d and subsequently receives a management frame 72d including the count value of 0, the terminal device 30 switches the channel to use to CH-y at time t22 following the reception of a data frame 74d. The management frames 72a-72d shown in FIG. 6 correspond to the frames 65 shown in FIG. 4.

Figure 7:
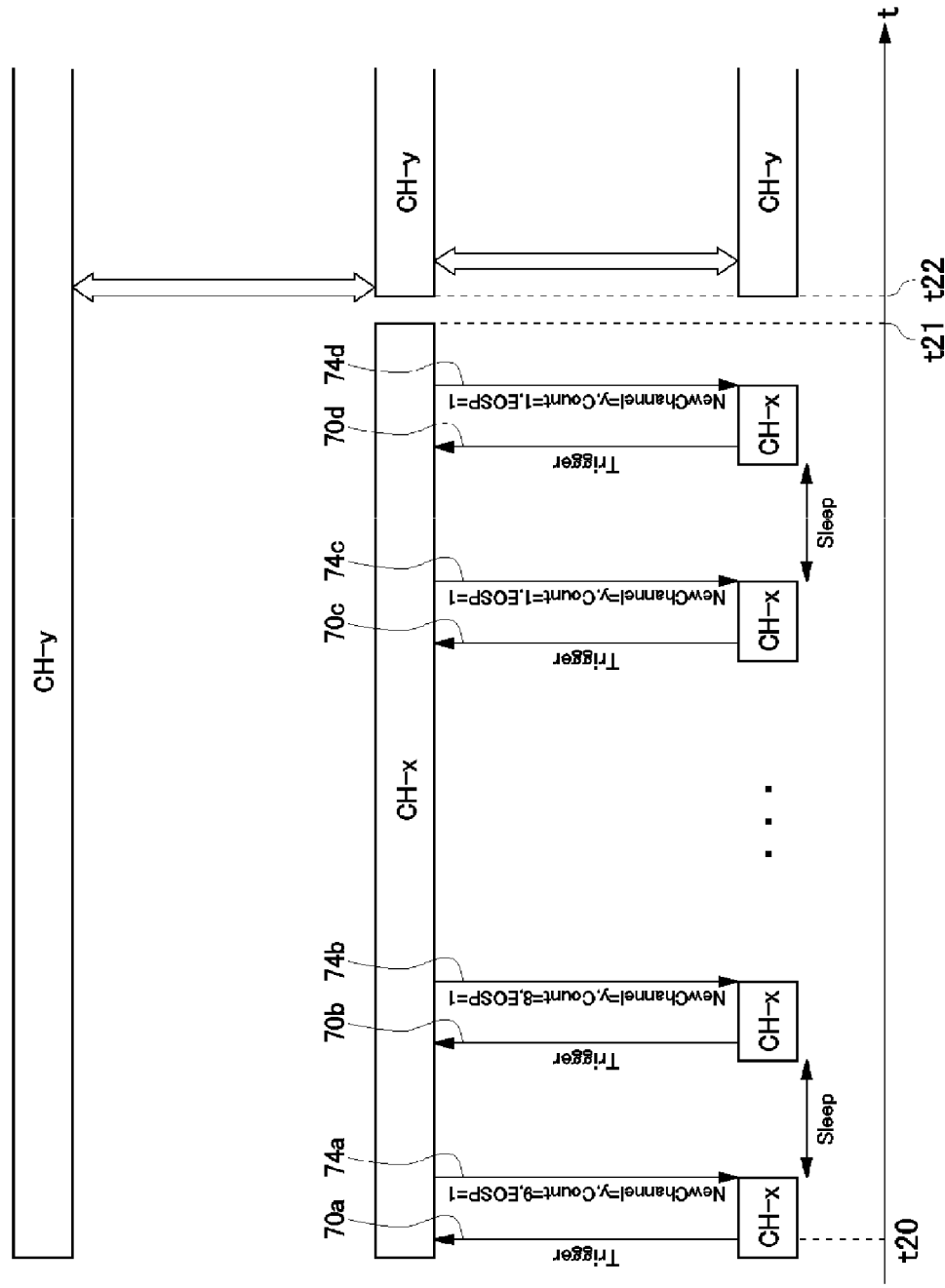
FIG. 7 shows a sequence for switching the channel by using a data frame in which Information Element for channel switching is added.

FIG. 7 shows a sequence for switching the channel by using a data frame in which Information Element for channel switching is added. In the example shown in FIG. 7, the need to transmit the management frames 72 shown in FIG. 6 is eliminated by adding Information Element in data frames. Since the terminal device 30 need not receive a management frame, the period between the transmission of a trigger signal and the reception of a data frame can be reduced so that the sleep period can be extended accordingly. The data frames 74a-74d shown in FIG. 7 correspond to the frames 65 shown in FIG. 4.

A description will now be given of the operation of the components in the wireless communication device 10 with reference to FIGS. 3-7. The first communication control unit 100 controls communication with the wireless relay device 40, and the second communication control unit 200 controls communication with the terminal device 30. The transmission and reception unit 50 selects from the plurality of frequency channels included in the channel list and uses one of the frequency channels to transmit and receive a frame.

The communication status monitoring unit 102 of the first communication control unit 100 monitors the status of communication between the first communication control unit 100 and the wireless relay device 40. When the communication status monitoring unit 102 determines that the reception frame acquisition unit 110 can no longer receive a frame in CH-x via the reception unit 54, the unit 102 delivers a command to execute a scanning process to the search processing unit 104. The search processing unit 104 maintains the channel list and scans the plurality of frequency channels included in the channel list so as to search for the wireless relay device 40.

In the first exemplary embodiment, it is assumed that the wireless relay device 40 switches the channel to use while the wireless communication device 10 is concurrently connecting to the wireless relay device 40 and the terminal device 30. For example, the technology of the first exemplary embodiment will be equally applied when a need arises for the wireless communication device 10 to connect to the wireless relay device 40 while communicating with the terminal device 30, or when the wireless communication device 10 searches for the different wireless relay device 40.

As shown in FIG. 4, the search processing unit 104 in the wireless communication system 1 according to the first exemplary embodiment divides the plurality of frequency channels included in the channel list into a plurality of groups so as to perform periodical, discontinuous active scans to search for the wireless relay device 40. At least one frequency channel is included in each group. In the illustrated example, the search processing unit 104 searches for the wireless relay device 40 on one frequency channel in a single search step. While the search processing unit 104 is searching for the wireless relay device 40, the second communication control unit 200 maintains connection with the terminal device 30 so to prevent the air link with the terminal device 30 from being disconnected. For this purpose, the search processing unit 104 provides information related to the search time to the scan information acquisition unit 202. The search processing unit 104 may provide the information related to the search time before starting each search step. However, in the case of performing active scans of the entire channels, because the active scans can be scheduled in advance, the information related to the time required for the entire search steps may be provided before the first search step is started.

The scan information acquisition unit 202 in the second communication control unit 200 acquires information related to the search time (hereinafter, referred to as "scan information"). The scan information may be information related to the start clock time and the end clock time of a search step. The clock information may be defined in absolute clock time or relative clock time. The CL transmission timing determination unit 204 determines the time to transmit a trigger signal from the terminal device 30 based on the acquired scan information. The CL transmission timing determination unit 204 defines the transmission time to be in a period when the search processing unit 104 is not performing a search step. More specifically, the CL transmission timing determination unit 204 defines the transmission time to be in a period between successive search steps, i.e., after the current search step is completed and before the next search step is started. The CL transmission timing determination unit 204 may determine the timing when the reception frame acquisition unit 208 acquires a trigger signal via the reception unit 54. Alternatively, the CL transmission timing determination unit 204 may determine the timing when the scan information acquisition unit 202 acquires the scan information. The transmission frame generation unit 206 generates a transmission frame (the data frames 64a-64c of FIG. 4) in which timing information designating the timing to transmit a trigger signal and EOSP of a bit value of 1 are added. The transmission unit 52 transmits the generated transmission frame to the terminal device 30.

Upon detecting the wireless relay device 40 by active scan, the search processing unit 104 identifies the frequency channel used by the detected wireless relay device 40 and stores the channel in a buffer. When the first search step is completed, the search processing unit 104 notifies the frequency channel determination unit 106 accordingly. The frequency channel determination unit 106 switches the frequency channel for use in the transmission and reception unit 50 to CH-x. This allows the second communication control unit 200 to transmit and receive a frame to and from the terminal device 30. Since the second communication control unit 200 also has a knowledge of the end clock time of the scan, the second communication control unit 200 may switch the frequency channel for use in the transmission and reception unit 50 to CH-x. When it is time to start the next search step, the search processing unit 104 defines the frequency channel to be scanned for use in the transmission and reception unit 50 and starts a scanning step accordingly. By repeating the above steps, the search processing unit 104 completes active scans of the entire channels.

When the entire channels have been actively scanned at time t19, the frequency channel determination unit 106 refers to the frequency channel stored in the buffer by the search processing unit 104 and determines to switch to the frequency channel. When the frequency channel determination unit 106 determines the frequency channel (CH-y) to use, the unit 106 communicates the information to the transmission frame generation unit 206. After time t20, the transmission frame generation unit 206 continues to generate transmission frames as shown in FIGS. 6 and/or 7 in which Information Element for channel switching is added, and the transmission unit 52 transmits the frames to the terminal device 30. This allows the second communication control unit 200 and the terminal device 30 to define the frequency identified by the search processing unit 104 as the frequency channel to use. Switching of the frequency will be described in detail in the second exemplary embodiment.

According to the first exemplary embodiment, the system does not perform active scans of the entire channels included in a channel list continuously. Instead, search steps, each searching at least on one channel, are performed in a time-divided manner, thereby enabling data transmission and reception between the wireless communication device 10 and the terminal device 30 between successive search steps. This can reduce the duration of communication delay and secures certain degree of real-timeness for data transmission and reception.

Second Exemplary Embodiment

Figure 8:
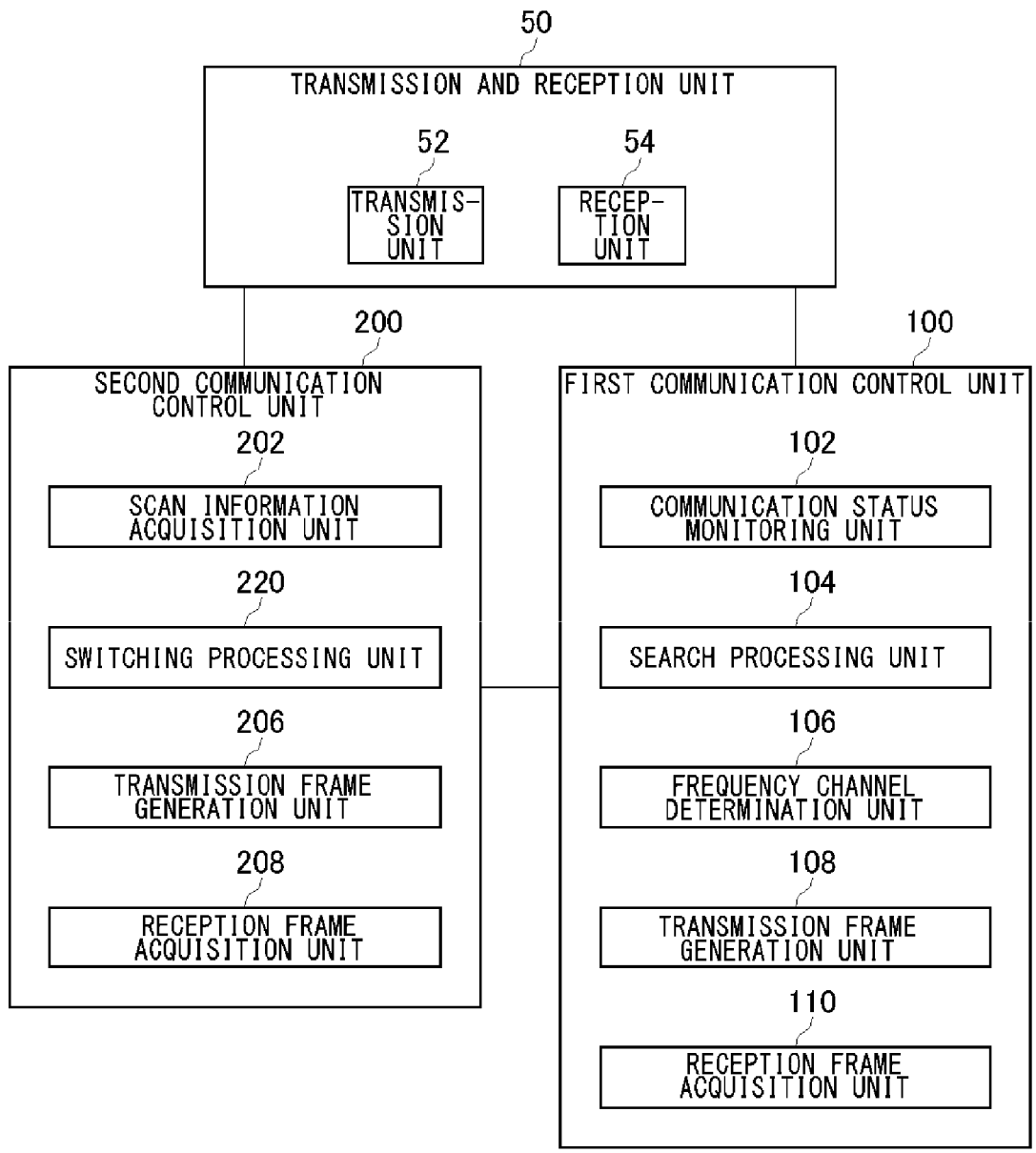
FIG. 8 shows functional blocks of the wireless communication device according to the second exemplary embodiment.

FIG. 8 shows functional blocks of the wireless communication device 10 according to the second exemplary embodiment. The wireless communication device 10 is provided with a transmission and reception unit 50, a first communication control unit 100, and a second communication control unit 200. Referring to FIG. 1, the transmission and reception unit 50 corresponds to the PHY unit 12 and is provided with a transmission unit 52 and a reception unit 54. The first communication control unit 100 corresponds to the first MAC unit 20a for controlling transmission and reception of a frame to and from the wireless relay device 40, and the second communication control unit 200 corresponds to the second MAC unit 20b for controlling transmission and reception of a frame to and from the terminal device 30. The first communication control unit 100 is provided with a communication status monitoring unit 102, a search processing unit 104, a frequency channel determination unit 106, a transmission frame generation unit 108, and a reception frame acquisition unit 110. The second communication control unit 200 is provided with a scan information acquisition unit 202, a switching processing unit 220, a transmission frame generation unit 206, and a reception frame acquisition unit 208. Referring to FIG. 8, those components denoted by the same symbols as in FIG. 3 have the same or similar function as that of the corresponding components of FIG. 3. For convenience of explanation, the first communication control unit 100 and the second communication control unit 200 are shown in FIG. 8 as being separate functional blocks. As described above, the first MAC unit 20a and the second MAC unit 20b may be implemented in a single MAC module. By implementing the MAC units in a single MAC module, the transmission frame generation unit 108 and the transmission frame generation unit 206 may be integrated into a single transmission frame generation unit. Even when the MAC units are implemented in a single MAC module, the reception frame acquisition unit 110 and the reception frame acquisition unit 208 are provided as separate reception frame acquisition units.

The functions of the first communication control unit 100 and the second communication control unit 200 may be implemented by a CPU, a memory, a program loaded in the memory, etc. FIG. 8 depicts functional blocks implemented by the cooperation of these elements. Therefore, it will be obvious to those skilled in the art that the functional blocks may be implemented in a variety of manners by hardware only, software only, or a combination of thereof.

Figure 9:
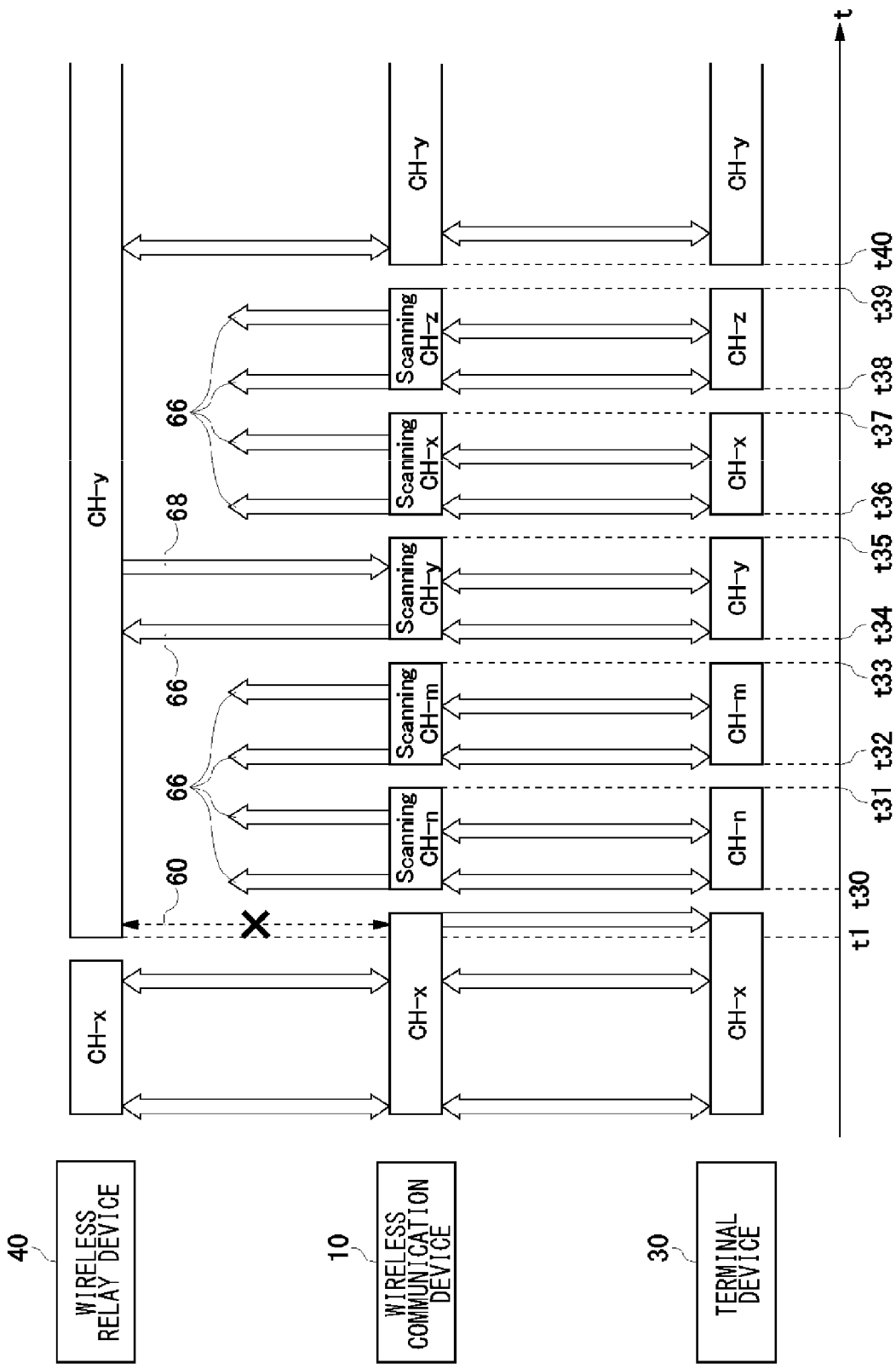
FIG. 9 shows a transition sequence of channel switching in the wireless communication system comprising the wireless communication device according to the second exemplary embodiment.

FIG. 9 shows a transition sequence of channel switching in the wireless communication system 1 comprising the wireless communication device 10 according to the second exemplary embodiment. For convenience of explanation, only one terminal device 30 is shown. Alternatively, a plurality of terminal devices may be included in the system. The terminal device 30 operates in a power saving mode that uses U-APSD. The terminal device 30 transmits a trigger signal to the wireless communication device 10 (access point). When the terminal device 30 receives EOSP of a bit value of 1 from the wireless communication device 10, the device 30 goes to sleep. The terminal device 30 defines the next startup time by itself. When the terminal device 30 starts up, the device 30 transmits a trigger signal to the wireless communication device 10, and transmits and receives a frame until it receives EOSP of a bit value of 1. For example, the terminal device 30 starts up itself at periods of 10 ms. In the wireless communication device 10 according to the second exemplary embodiment 2, the second communication control unit 200 communicates with the terminal device 30 on the frequency channel in which the search processing unit 104 is searching for the wireless relay device 40.

In the example shown in FIG. 9, the wireless communication device 10 has established an air link with the wireless relay device 40 and the terminal device 30 using channel x (CH-x) in the first place. At time t1, the wireless relay device 40 switches the channel to use to channel y (CH-y). After time t1, the wireless communication device 10 attempts to send a frame 60 in CH-x to the wireless relay device 40, but the transmission of the frame 60 fails because the wireless relay device 40 no longer uses CH-x. After repeating failed attempts predetermined several times, the wireless communication device 10 learns that the wireless relay device 40 is not using CH-x and starts an active scan at time t30.

Before scanning a frequency channel, the wireless communication device 10 communicates to the terminal device 30 information related to the scanned frequency channel (hereinafter, referred to as "scanned channel") along with EOSP of a bit value of 1. In the second exemplary embodiment, the terminal device 30 switches the frequency channel so as to tune into the scanned channel of the wireless communication device 10. To allow the terminal device 30 to tune into the scanned channel, the wireless communication device 10 communicates to the terminal device 30 information related to the timing to start a search step in each scanned channel along with the information related to the scanned channel. When the terminal device 30 receives the communication, the device 30 switches to the scanned channel for use when a search step on a new frequency channel is started.

The wireless communication device 10 maintains a channel list of frequency channels that can be used. In the second exemplary embodiment, the wireless communication device 10 continuously scans all frequency channels included in the channel list. The terminal device 30 follows the switching of the scanned channel and switches the channel to use accordingly. Therefore, disconnection between the terminal device 30 and the wireless communication device 10 is prevented from occurring during an active scan by the wireless communication device 10, and real time data transmission and reception between the terminal device 30 and the wireless communication device 10 is secured.

The wireless communication device 10 starts a search step in a frequency channel (CH-n) at time t30 and completes the search step at time t31. Subsequently, the wireless communication device 10 starts a search step in CH-m at time t32 and completes the search step at time t33. Subsequently, the wireless communication device 10 performs a search step in CH-y between time t34 and time t35, performs a search step in CH-x between time t36 and time t37, and performs a search step in CH-z between time t38 and time t39. The wireless communication device 10 communicates to the terminal device 30 the channel scanned next time and information related to the time to start a search step, while the current search step is proceeding.

In active scan, the wireless communication device 10 transmits a probe request frame 66. If the wireless relay device 40 is using the frequency channel of the probe request frame 66, the wireless relay device 40 generates a probe response frame 68 and returns the frame 68 to the wireless communication device 10. In the example shown in FIG. 9, the wireless communication device 10 receives the probe response frame 68 from the wireless relay device 40 in the active scan (search step) in the third frequency channel. This allows the wireless communication device 10 to know the existence of the wireless relay device 40 and identify the frequency channel used by the wireless relay device 40. FIG. 9 shows active scans in five frequency channels, but, in practice, 13 frequency channels are actively scanned in succession.

When active scans of the entire frequency channels are completed, the wireless communication device 10 determines the frequency channel for connection to the wireless relay device 40. Between time t38 and time t39, the wireless communication device 10 communicates the determined frequency channel to the terminal device 30. The wireless communication device 10 may also communicate the channel switching timing.

In the second exemplary embodiment, the terminal device 30 switches the channel to use to adapt to the scanned channel of the wireless communication device 10. Switching can be achieved by including Information Element for channel switching in a management frame or a data frame, as described with reference to FIGS. 6 and 7 showing the first exemplary embodiment.

A description will now be given of the operation of the components in the wireless communication device 10 with reference to FIGS. 8-9. The first communication control unit 100 controls communication with the wireless relay device 40, and the second communication control unit 200 controls communication with the terminal device 30. The transmission and reception unit 50 selects from the plurality of frequency channels included in the channel list and uses one of the frequency channels to transmit and receive a frame.

The communication status monitoring unit 102 of the first communication control unit 100 monitors the status of communication between the first communication control unit 100 and the wireless relay device 40. When the communication status monitoring unit 102 determines that the reception frame acquisition unit 110 can no longer receive a frame in CH-x via the reception unit 54, the unit 102 delivers a command to execute a scanning process to the search processing unit 104. The search processing unit 104 scans the plurality of frequency channels included in the channel list so as to search for the wireless relay device 40.

In the second exemplary embodiment, it is assumed that the wireless relay device 40 switches the channel to use while the wireless communication device 10 is concurrently connecting to the wireless relay device 40 and the terminal device 30. For example, the technology of the second exemplary embodiment will equally be applied when a need arises for the wireless communication device 10 to connect to the wireless relay device 40 while communicating with the terminal device 30, or when the wireless communication device 10 searches for the different wireless relay device 40.

As shown in FIG. 9, the search processing unit 104 in the wireless communication system 1 according to the second exemplary embodiment switches the plurality of frequency channels included in the channel list in succession to perform an active scan. While the search processing unit 104 is searching for the wireless relay device 40, the second communication control unit 200 maintains connection with the terminal device 30 so as to prevent the air link with the terminal device 30 from being disconnected. For this purpose, the search processing unit 104 provides information related to the scanned channel to the scan information acquisition unit 202. The search processing unit 104 may provide the information related to the scanned channel to the scan information acquisition unit 202 before starting a search step in each frequency channel. However, in the case of performing active scans of the entire channels, because the active scans can be scheduled in advance, the information related to the entirety of actively scanned channels may be provided before the search step in the first frequency channel is started. The search processing unit 104 also provides the scan information acquisition unit 202 with information related to the timing to start a search process in each frequency channel.

The scan information acquisition unit 202 in the second communication control unit 200 acquires information related to the scanned channel and the timing to start a search step. The switching processing unit 220 uses the acquired information to generate information to notify the terminal device 30 of channel switching. The transmission frame generation unit 206 generates a transmission frame in which the information related to the scanned channel and the timing to start a scan, and EOSP of a bit value of 1 are added. The transmission unit 52 transmits the generated transmission frame to the terminal device 30.

Upon detecting the wireless relay device 40 by active scan, the search processing unit 104 identifies the frequency channel used by the detected wireless relay device 40 and stores the channel in a buffer. When the entire channels have been actively scanned at time t39, the frequency channel determination unit 106 refers to the frequency channel stored in the buffer by the search processing unit 104 and determines to switch to the frequency channel. When the frequency channel determination unit 106 determines the frequency channel (CH-y) to use, the unit 106 communicates the information to the transmission frame generation unit 206. The transmission frame generation unit 206 generates a transmission frame as shown in FIGS. 6 and 7 in which Information Element for channel switching is added, and the transmission unit 52 transmits the frame to the terminal device 30. This allows the second communication control unit 200 and the terminal device 30 to switch to the frequency identified by the search processing unit 104 for use. As described with reference to FIG. 15, if the scanning is aborted when the wireless relay device 40 is detected, the transmission frame generation unit 206 may generate, when the scanning is aborted, a transmission frame in which the information identifying the frequency channel to be used by the wireless relay device 40 is added.

Figure 10:
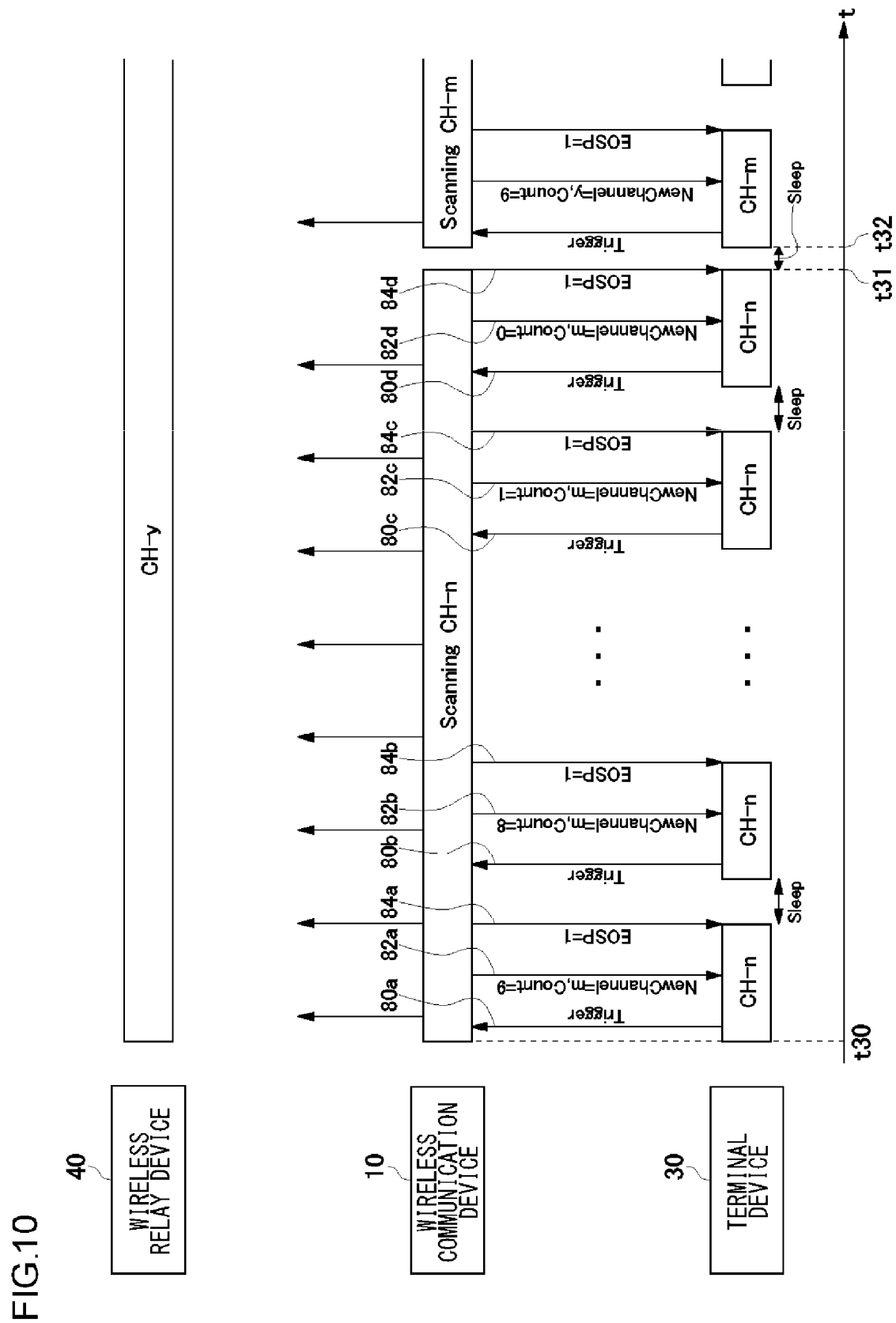
FIG. 10 shows a sequence for switching the channel by using a management frame in which Information Element for channel switching is added.

FIG. 10 shows a sequence of performing channel switching by using a management frame in which Information Element for channel switching is added. FIG. 10 shows a detailed sequence between time t30 and time t32 in FIG. 9. The terminal device 30 operates in U-APSD and so goes to sleep when it receives EOSP of a bit value of 1 as shown in FIG. 10.

When the terminal device 30 transmits a trigger signal 80a to the wireless communication device 10, the wireless communication device 10 transmits a management frame 82a to the terminal device 30. The management frame 82a is configured to include Information Element shown in FIG. 5. In this case, the management frame 82a includes data indicating "New Channel=m" and "Count=9". Referring to FIG. 5, "New Channel=m" indicates that the channel to make a transition to is CH-m, and "Count=9" indicates the countdown information of 9. After transmitting the management frame 82a, the wireless communication device 10 transmits to the terminal device 30 a data frame 84a in which EOSP indicating a bit value of 1 is added.

Referring to FIG. 9, the search period per channel is defined to be 100 ms in the wireless communication system 1 according to the second exemplary embodiment. The terminal device 30 recovers from the sleep state at periods of 10 ms and transmits a trigger signal 80b. The terminal device 30 receives a management frame 82b and a data frame 84b from the wireless communication device 10 in the stated order. In the management frame 82b, the value of "Channel Switch Count" is decremented by one. Thus, the value of "Channel Switch Count" is used as countdown information. The step is repeated. When the terminal device 30 transmits a trigger signal 80d and subsequently receives a management frame 82d including the count value of 0, the terminal device 30 switches the channel to use to CH-m at time t32 following the reception of a data frame 84d.

The scan information acquisition unit 202 acquires from the search processing unit 104 the information identifying the channel actively scanned and the timing to start a scan. The switching processing unit 220a creates Information Element to be added to the management frame by referring to the information acquired by the scan information acquisition unit 202. A description will be given below of the method of generating "Count" value.

The switching processing unit 220 has a knowledge of the timing to start scanning each frequency channel. The switching processing unit 220 determines a count value based on the remaining time between the time when the reception frame acquisition unit 208 acquires a trigger signal and the time to start scanning. FIG. 11A shows a count value determination table. The table is provided for the terminal device 30 which transmits a trigger signal at periods 10 ms and is stored in a memory. For example, if there are a plurality of terminal devices 30, the switching processing unit 220 stores a period T of transmitting a trigger signal for each terminal device 30. The switching processing unit 220 determines the maximum value of Count value according to the following expression, using the active scan period (100 ms) per frequency channel. Equating the duration of one count with the transmission period T, the maximum Count value=(active scan time/transmission period T)−1. Referring to FIG. 11A, the duration of one count is equal to the time step of the remaining time. For this reason, a given count value has a maximum margin of error equal to the time step.

FIG. 11B shows another exemplary count value determination table. The table is provided for the terminal device 30 which transmits a trigger signal at periods 20 ms. The above expression gives the maximum Count value of 4.

The plurality of terminal devices 30 operate independently in the wireless communication system 1. For example, a very long transmission period T may be set in a given terminal device 30 for the purpose saving power. It is therefore preferable that the switching processing unit 220 stores tables compatible with all transmission periods T selectable by the terminal device 30. It is also preferable that the switching processing unit 220 has a knowledge of the transmission period T selected by the terminal device 30 connected as a client. This allows referring to a proper table suited to the transmission period T of the terminal device 30 and deriving a proper Count value for each terminal device 30.

Since the wireless communication system 1 uses the CSMA/CA protocol, the terminal device 30 may not be able to transmit a trigger signal. Further, in the wireless environment, the terminal device 30 may not be able to receive a frame signal from the wireless communication device 10 properly. In this case, a packet loss occurred. The switching processing unit 220 does not simply decrement the previous Count value by one but determines the Count value according to the table shown in FIG. 11. In other words, even if the reception frame acquisition unit 208 cannot acquire the trigger signal 80a in FIG. 10, the switching processing unit 220 determines, when the trigger signal 80b is acquired, the Count value of 8 by referring to the remaining time before the channel switching timing.

If the terminal device 30 can receive the management frame 82 at least once, the device 30 can acquire the channel information to be switched next and the Count value at that time, and can determine the channel switching timing by using the Count value. Thus, transmission of the management frames 82 a plurality of times during scanning dramatically increases the likelihood that information related to channel switching is transmitted to the terminal device 30.

In this example, Information Element such as the Count value is assumed to be included in the management frame. Alternatively, Information Element may be added to the data frame as shown in FIG. 7. Still alternatively, Information Element such as the Count value may not be used. For example, information related to the remaining time before switching the channel may be included in a frame and transmitted to the terminal device 30. By including the remaining time directly in a frame, channel switching control of the terminal device 30 is advantageously facilitated.

Figure 12:
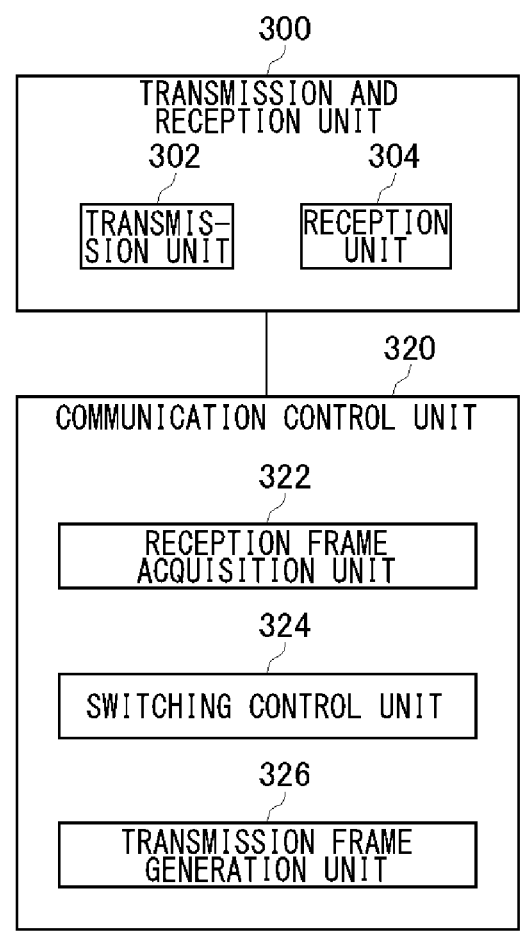
FIG. 12 shows the functional blocks of the terminal device.

FIG. 12 shows the functional blocks of the terminal device 30. The terminal device 30 is provided with a transmission and reception unit 300 and a communication control unit 320. Referring to FIG. 1, the transmission and reception unit 300 corresponds to the PHY unit 32 and is provided with a transmission unit 302 and a reception unit 304. The communication control unit 320 corresponds to the MAC unit 34 and comprises a reception frame acquisition unit 322, a switching control unit 324, and a transmission frame generation unit 326.

The functions of the communication control unit 320 may be implemented by a CPU, a memory, a program loaded in the memory, etc. FIG. 3 depicts functional blocks implemented by the cooperation of these elements. Therefore, it will be obvious to those skilled in the art that the functional blocks may be implemented in a variety of manners by hardware only, software only, or a combination of thereof.

When the reception frame acquisition unit 322 acquires a management frame or a data frame that includes Information Element for channel switching via the reception unit 304, the switching control unit 324 extracts the information (New Channel Number) related to the frequency channel scheduled to be scanned by the wireless communication device 10 and the information (Channel Switch Count) related to the timing to start a scan. The switching control unit 324 has a knowledge of its own transmission period T and maintains a table similar to the count value determination table shown in FIG. 11.

FIG. 13A shows an exemplary remaining time determination table. The table shown in FIG. 13A is used when the transmission period T of the terminal device 30 is 10 ms. FIG. 13B shows another exemplary remaining determination table. The table shown in FIG. 13B is used when the transmission period T of the terminal device 30 is 20 ms. The switching control unit 324 selects a table to refer to, based on the transmission period T of the host device and determines the remaining time from the extracted Count value. The switching control unit 324 switches to the extracted frequency channel for use when the determined remaining time elapses.

In the second exemplary embodiment, the terminal device 30 has a maximum of ten opportunities to receive a management frame. For example, when the reception frame acquisition unit 322 acquires a plurality of management frames, the switching control unit 324 may determine the channel switching timing based on the Count value in the management frame acquired first. Using the first Count value communicated is advantageous because the switching control unit 324 needs not analyze the content of the subsequent management frames. The channel switching timing may be determined based on the Count value acquired last.

In the second exemplary embodiment, the frequency channel of the wireless relay device 40 is described as being determined after scanning all frequency channels. Alternatively, an active scan may be terminated when the probe response frame 68 is received from the wireless relay device 40.

Figure 14:
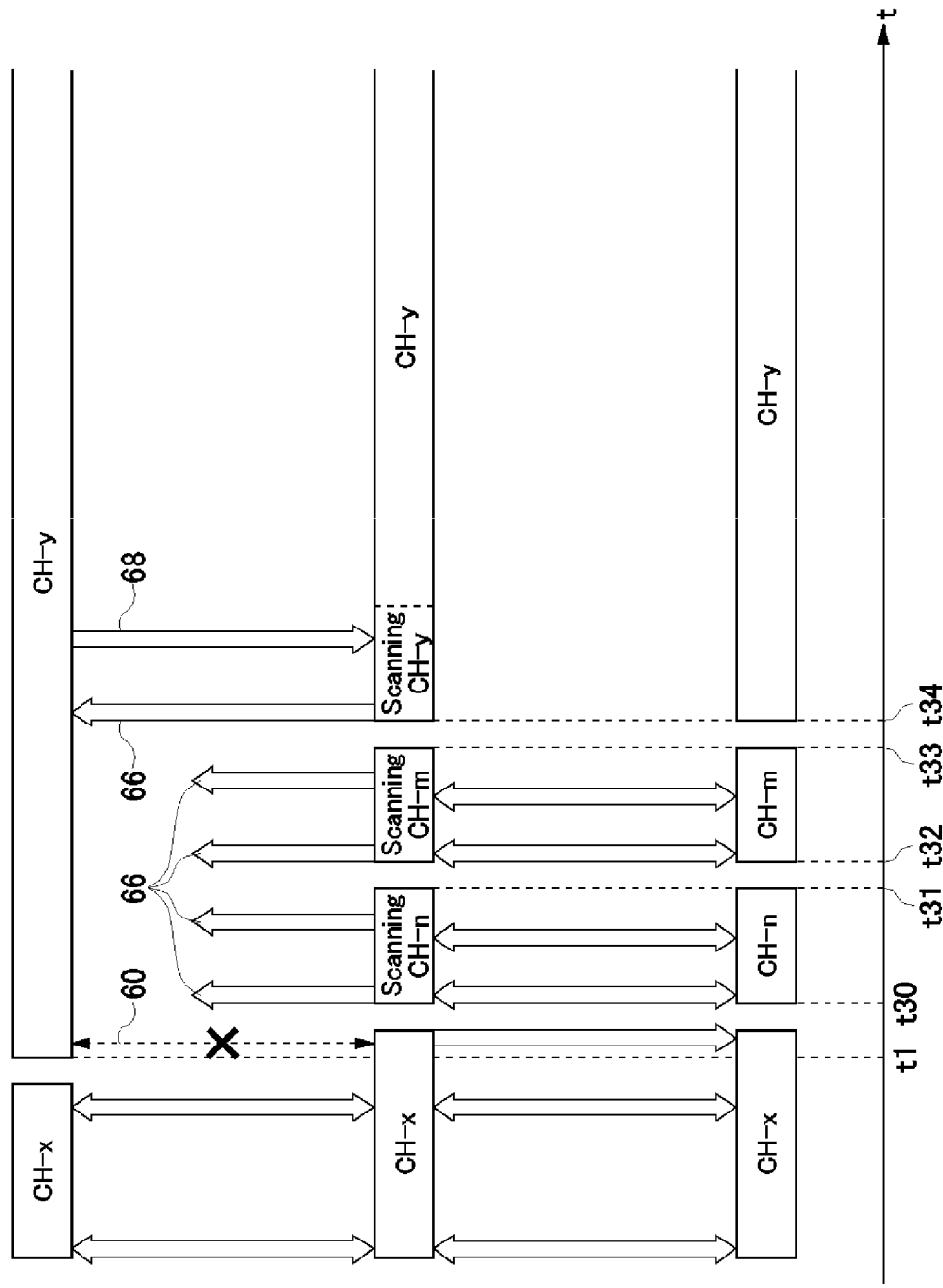
FIG. 14 shows a variation of the transition sequence of channel switching shown in FIG. 9.

FIG. 14 shows a variation of the transition sequence of channel switching shown in FIG. 9. After time t34, the wireless relay device 40 transmits the probe response frame 68 in response to the transmission of the probe request frame 66 from the wireless communication device 10 in CH-y. This allows the wireless communication device 10 to know the existence of the wireless relay device 40 using CH-y. The wireless communication device 10 may then terminate the scheduled scan steps and connect to the wireless relay device 40.

FIG. 15 shows the transition sequence of channel switching shown in FIG. 14 in further detail. FIG. 15 shows the sequence after time t34 of FIG. 14. When the search processing unit 104 transmits the probe request frame 66 and the reception frame acquisition unit 110 acquires the probe response frame 68, the search processing unit 104 detects that the wireless relay device 40 is using CH-y. The search processing unit 104 transmits an authentication request frame 94 to the wireless relay device 40 in order to establish an air link.

The search processing unit 104 determines to abort the active scan when the authentication request frame 94 is transmitted. Meanwhile, as the transmission frame generation unit 206 generates a transmission frame in which Information Element for channel switching is added, this process should also be stopped. Thus, the search processing unit 104 notifies the scan information acquisition unit 202 of the fact CH-y is determined as the channel to use. The scan information acquisition unit 202 delivers the information to the switching processing unit 220, and the switching processing unit 220 creates Information Element to be added to the management frame. More specifically, the switching processing unit 220 adds "New Channel=y" and "Switch Mode=0" to the management frame.

"Switch Mode=0" indicates that channel switching is not performed. Upon receipt of "Switch Mode=0", the switching control unit 324 in the terminal device 30 determines that channel switching control is terminated and does not change the current frequency channel (CH-y). This allows the switching control unit 324 to abort the control for channel switching in accordance with Information Element received in the past. By terminating the active scan when the wireless relay device 40 is identified, useless channel switching is eliminated and power saving of the terminal device 30 is promoted.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. A wireless communication device comprising:
   a first communication control unit configured to control communication with a first terminal device;
   a second communication control unit configured to control communication with a second terminal device; and
   a transmission and reception unit configured to transmit and receive a frame using one of a plurality of frequency channels,
   wherein the first communication control unit comprises a search processing unit configured to scan the plurality of frequency channels to search for the first terminal device,
   wherein the second communication control unit maintains connection with the second terminal device using a first frequency channel among the plurality of frequency channels while the search processing unit is searching for the first terminal device,
   wherein, when the search processing unit detects the first terminal device and identifies a second frequency channel among the plurality of frequency channels used by the detected first terminal device, the second communication control unit switches from the first frequency channel to the second frequency channel identified by the search processing unit to control communication with the second terminal device, and
   wherein the second communication control unit communicates with the second terminal device using the first frequency channel during a time period when the search processing unit searches for the first terminal device using at least another frequency channel.

2. The wireless communication device according to claim 1, wherein, when the search processing unit identifies the second frequency channel used by the first terminal device, the transmission and reception unit communicates with the second terminal device to transfer information on the identified second frequency channel.

3. The wireless communication device according to claim 2, wherein the second communication control unit comprises a transmission frame generation unit configured to generate a frame that includes the information on the identified second frequency channel, and wherein the transmission and reception unit comprises a transmission unit configured to transmit the generated frame to the second terminal device.

4. The wireless communication device according to claim 3, wherein the second communication control unit communicates with the second terminal device on the frequency channel on which the search processing unit searches for the first terminal device.

5. The wireless communication device according to claim 4, wherein
the second communication control unit comprises an acquisition unit configured to acquire information related to the frequency channel on which the search processing unit searches for the first terminal device,
the transmission frame generation unit generates a frame that includes the information on the frequency channel, and
the transmission unit transmits the generated frame to the second terminal device.

6. The wireless communication device according to claim 1, wherein the second communication control unit comprises:
an acquisition unit configured to acquire information related to a search time required by the search processing unit; and
a determination unit configured to determine the transmission time of a frame from the second terminal device,
wherein the determination unit uses the information related to the search time to define the transmission time to be in a period when the search processing unit is not performing a search, and
wherein the transmission frame generation unit generates a frame that includes information related to the determined transmission time.

7. The wireless communication device according to claim 6, wherein the determination unit determines the transmission time of a frame from the second terminal device after a search by the search processing unit for the first terminal device on at least one frequency channel is completed.

8. The wireless communication device according to claim 6, wherein, upon completion of the search by the search processing unit, the first communication control unit or the second communication control unit switches the frequency channel to be used by the transmission and reception unit from the channel on which the search processing unit searches for the first terminal to the channel previously used between the second communication control unit and the second terminal device.

9. A wireless communication system comprising a wireless communication device, a first terminal device connected to the wireless communication device, and a second terminal device connected to the wireless communication device, the first terminal device operating as an access point for the wireless communication device, and the wireless communication device operating as an access point for the second terminal device,
wherein the wireless communication device comprises:
a first communication control unit configured to control communication with the first terminal device;
a second communication control unit configured to control communication with the second terminal device; and
a transmission and reception unit configured to transmit and receive a frame using one of a plurality of frequency channels,
wherein the first communication control unit comprises a search processing unit configured to scan the plurality of frequency channels to search for the first terminal device,
wherein the second communication control unit maintains connection with the second terminal device using a first frequency channel among the plurality of frequency channels while the search processing unit is searching for the first terminal device,
wherein, when the search processing unit detects the first terminal device and identifies a second frequency channel among the plurality of frequency channels used by the detected first terminal device, the second communication control unit switches from the first frequency channel to the second frequency channel identified by the search processing unit to control communication with the second terminal device, and
wherein the second communication control unit communicates with the second terminal device using the first frequency channel during a time period when the search processing unit searches for the first terminal device using at least another frequency channel.

10. A channel switching method adapted for a wireless communication device comprising a first communication control unit configured to control communication with a first terminal device, a second communication control unit configured to control communication with a second terminal device, and a transmission and reception unit configured to transmit and receive a frame using one of a plurality of frequency channels,
wherein the first communication control unit scans the plurality of frequency channels to search for the first terminal device,
wherein the second communication control unit maintains connection with the second terminal device using a first frequency channel among the plurality of frequency channels while the first communication control unit is searching for the first terminal device, and when the first communication control unit detects the first terminal device and identifies a second frequency channel among the plurality of frequency channels used by the detected first terminal device, the second communication control unit defines a switch from the first frequency channel to the second frequency channel identified by the first communication control unit to communicate with the second terminal device, and
wherein the second communication control unit communicates with the second terminal device using the first frequency channel during a time period when first communication control unit searches for the first terminal device using at least another frequency channel.

11. A computer program embedded on a non-transitory computer-readable recording medium, adapted for execution of wireless communication functions in a computer comprising a first communication control unit and a second communication control unit, comprising:
a module configured to cause the first communication control unit to scan a plurality of frequency channels to search for a first terminal device,
a module configured to cause the second communication control unit to maintain connection with the second terminal device using a first frequency channel among the plurality of frequency channels while the first communication control unit is searching for the first terminal device, and causes, when the first communication control unit detects the first terminal device and identifies a second frequency channel among the plurality of frequency channels used by the identified first terminal device, the second communication control unit to define a switch from the first frequency channel to the second frequency channel used for communication with the second terminal device, and wherein the second communication control unit communicates with the second terminal device using the first frequency channel during a time period when first communication control unit searches for the first terminal device using at least another frequency channel.

* * * * *